United States Patent

[11] 3,572,951

| [72] | Inventors | Frederick Rothwarf; |
| | | Robert Esposito, Philadelphia, Pa. |
| [21] | Appl. No. | 771,540 |
| [22] | Filed | Oct. 29, 1968 |
| [45] | Patented | Mar. 30, 1971 |
| [73] | Assignee | The United States of America as represented by the Secretary of the Army |

[54] SINGLE MIRROR NORMAL INCIDENCE REFLECTOMETER
4 Claims, 5 Drawing Figs.

[52] U.S. Cl. .................................................. 356/212, 356/88
[51] Int. Cl. ................................................. G01n 21/48
[50] Field of Search ........................................ 356/95-—97, 209—212, 88, 93, 94; 350/6, 7

[56] References Cited
UNITED STATES PATENTS

| 2,215,211 | 9/1940 | Devol ......................... | 356/211 |
| 2,411,741 | 11/1946 | Michaelson .................. | 250/288X |
| 2,992,588 | 7/1961 | Henderson .................. | 250/288X |
| 3,238,368 | 3/1966 | McPherson .................. | 356/95X |

FOREIGN PATENTS

| 135,256 | 1961 | U.S.S.R. ....................... | 356/211 |

Primary Examiner—Ronald L. Wibert
Assistant Examiner—F.L. Evans
Attorneys—Harry M. Saragovitz, Edward J. Kelly, Herbert Berl and S. Dubroff ABSTRACT: A single beam reflectometer adaptable for use with commercial monochromators and employing a vacuum chamber which houses a mirror pivotable to either one of two positions. In the reference position, the mirror reflects the light beam emanating from the monochromator directly into a phototube detector. In the reflected position, the mirror reflects the beam reflected from the sample to be tested to the detector. The beam reflected from the sample strikes the mirror at the same incident angle and at the same point as the beam does when the mirror is in the reference position and thus falls on the detector at the same point and the same incident angle.

Patented March 30, 1971

INVENTORS
FREDERICK ROTHWARF
ROBERT J. ESPOSITO
BY Harry M. Saragovitz,
Edward J. Kelly, Herbert Berl
& S. Dubroff
ATTORNEYS.

INVENTORS
FREDERICK ROTHWARF
ROBERT J. ESPOSITO

ATTORNEYS

SINGLE MIRROR NORMAL INCIDENCE REFLECTOMETER

The invention described herein may be manufactured, used and licensed by or for the Government for governmental purposes without the payment to us of any royalties thereon.

This invention relates to optical devices and more particularly concerns a single beam reflectometer for determining specular reflectivity at nearly normal incidence from the visible to vacuum ultraviolet spectral region.

A need has existed in the past for precision measurements in the vacuum ultraviolet spectral region. Such precise measurements have not been capable of ready determination due to the lack of suitable monochromators which have only become commercially available over about the past decade. Reflectometers now being used with these monochromators require design changes in order to minimize the number of reflecting surfaces because of low reflectivity and high scatter that materials exhibit in the ultraviolet region of the electromagnetic spectrum. Thus, a reflectometer should possess the following desired properties:

a. It should be capable of making accurate and nearly absolute specular reflectivity determinations at nearly normal incidence from the visible to vacuum ultraviolet spectral region.

b. It should provide a high signal-to-noise ratio by having a minimum number of reflecting surfaces.

c. It should provide maximum intensity.

d. It should be relatively inexpensive, mechanically simple to construct, and require minimum maintenance.

e. It should be readily adaptable to commercial monochromators.

f. It should be an absolute reflectometer (if low scatter is neglected) if a perfectly collimated beam such as a laser source is used.

No single commercially available reflectometer has been found which satisfies all of the above requirements. For example, the type W reflectometer employs two reference mirrors which require frequent recalibration. If a single reference mirror is used, complications in the mechanical design for studies in a vacuum are introduced. Further, the multiple reflections from the reference and sample in a low reflectivity region of the spectrum such as the violet and vacuum ultraviolet, limit the precision of measurement by yielding a low signal-to-noise ratio.

The reflectometer of the type which includes a large vacuum box wherein the phototube is capable of rotating from the reflected to the reference position also suffers major disadvantages. Such a device is very expensive, is complicated to build, and requires a separate vacuum system and the utilization of special components having low vapor pressures.

The prior art dual beam reflectometer employs a beam splitter attachment which reduces intensity in low reflectivity regions to present unwanted intensity problems. The device requires two phototubes and the associated dual components and electronic instrumentation make it very costly. Further, calibration difficulties abound.

It is therefore a broad object of the invention to provide a reflectometer suffering substantially none of the prior art disadvantages and yet having the desired properties aforementioned.

The exact nature of the invention will be readily apparent from consideration of the following specification relating to the annexed drawings wherein.

Figure 1:
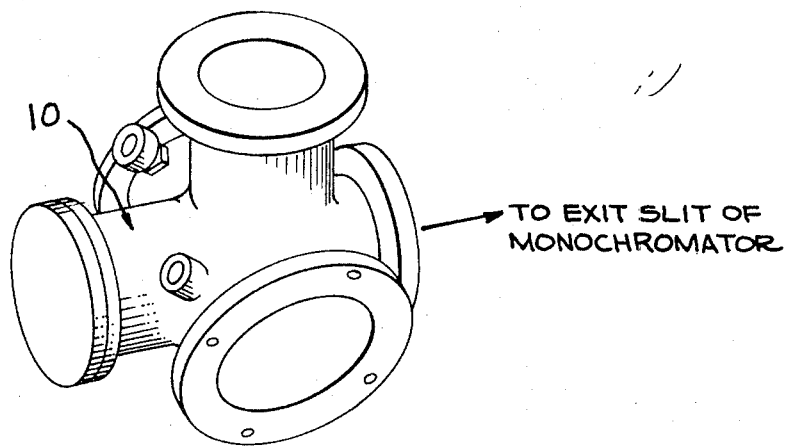
FIG. 1 illustrates a perspective view of a typical dual position attachment for use with a commercial monochromator.

Referring now to the drawings, our single beam reflectometer is adaptable for use with commercial monochromators, but was specifically designed for housing in a McPherson Model 651 detector-sample chamber which may be coupled to a McPherson Model 225 1-meter grating, vacuum ultraviolet monochromator.

Figure 2:
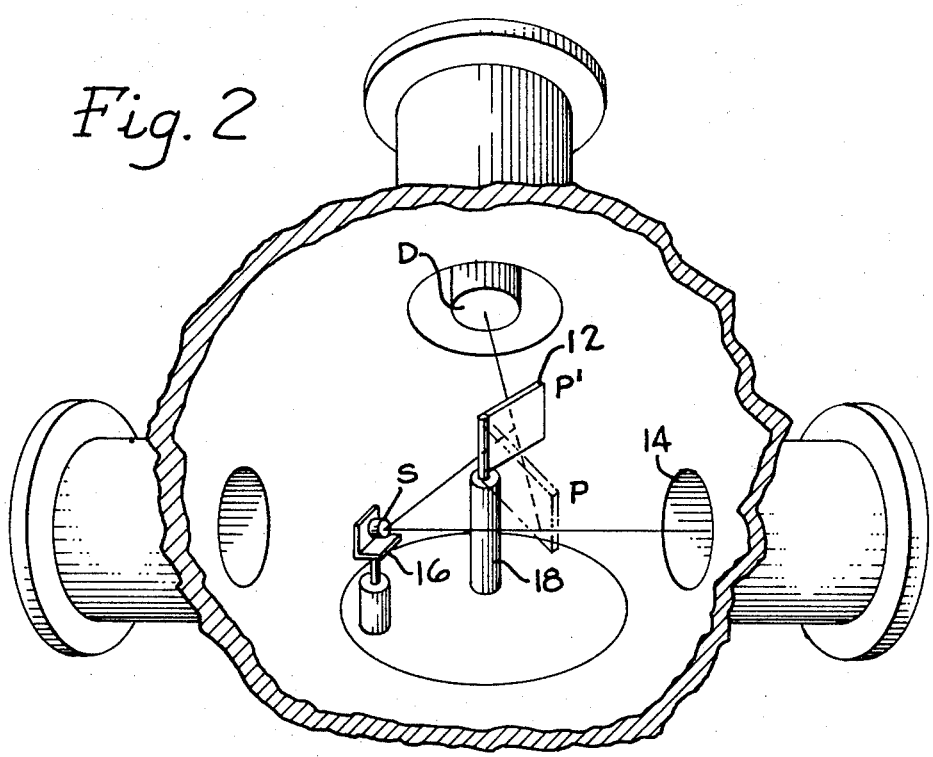
FIG. 2 is a cutaway view of the attachment of FIG. 1 showing our device operating therein.

The detector-sample chamber of the dual position attachment 10 of FIG. 1 is vacuum-sealable to a monochromator (not shown) as is well known in the art, and houses our inventive device as shown in FIG. 2, comprising a mirror 12 pivotable to points shown generally at P and P'. Light rays emanating from slit 14 of the monochromator are reflected from sample S to be tested which is mounted on a sample holder assembly 16, and thence to the mirror in position P' and finally to the photomultiplier tube detector D. The detector and its associated circuit components are mounted within the chamber in vacuum-sealed relation thereto by means well-known in the art. Pivotable mirror 12 is mounted on a mirror holder assembly 18 through a vacuum O-ring seal assembly to be described hereinafter.

Figure 3:
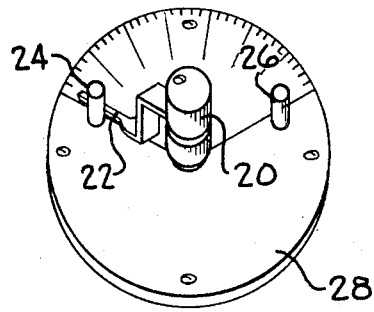
FIG. 3 is a perspective view looking up at the bottom of our device.

The respective positions for points P and P' are readily and reproducibly obtained by simply rotating knob 20 of mirror holder assembly such that pointer indicator 22 contacts either of protruding external stops 24 or 26 affixed to baseplate 28 of FIG. 3.

Figure 4:
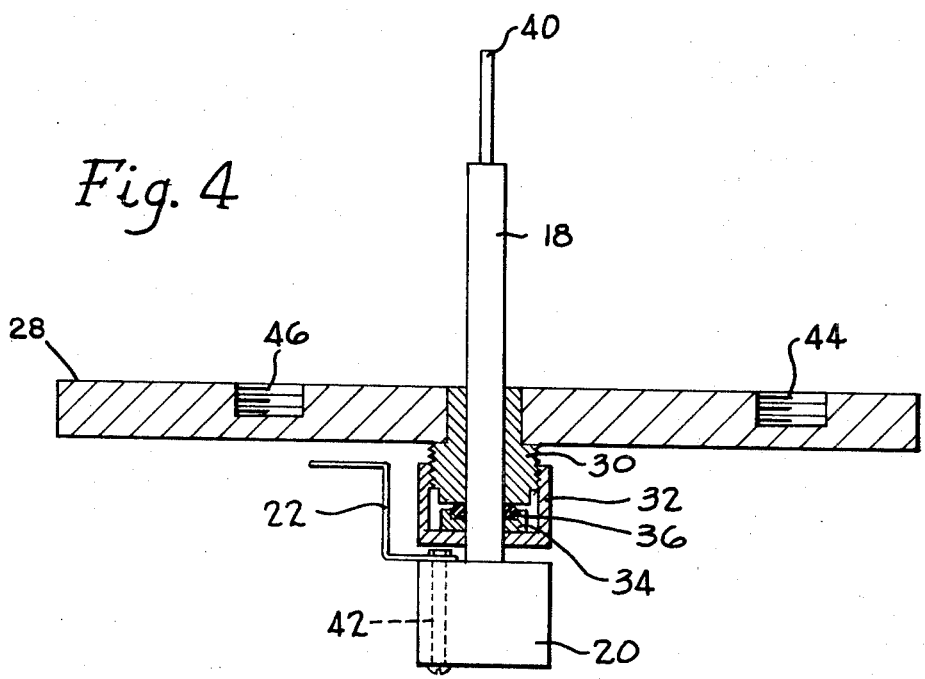
FIG. 4 is a sectional view through the mirror assembly holder, illustrating, among others, the vacuum seal.

The O-ring seal assembly is shown in detail in FIG. 4 and comprises a threaded flange member 30 received in a central opening of baseplate 28 and a threaded knurled cap 32 for coaction with the flange for urging washer 34 and O-ring 36 in airtight relation with the mirror holder assembly including knob 20, shaft 18 and rod 40 to which the mirror is mounted. Pointer 22 is affixed to knob 20 by suitable screw means as shown at 42.

The specimen or sample holder 16 is threadable into baseplate 28 at 44 and provision is made at 46 for receiving a filter, if desired, for obtaining a more monochromatic beam.

Figure 5:
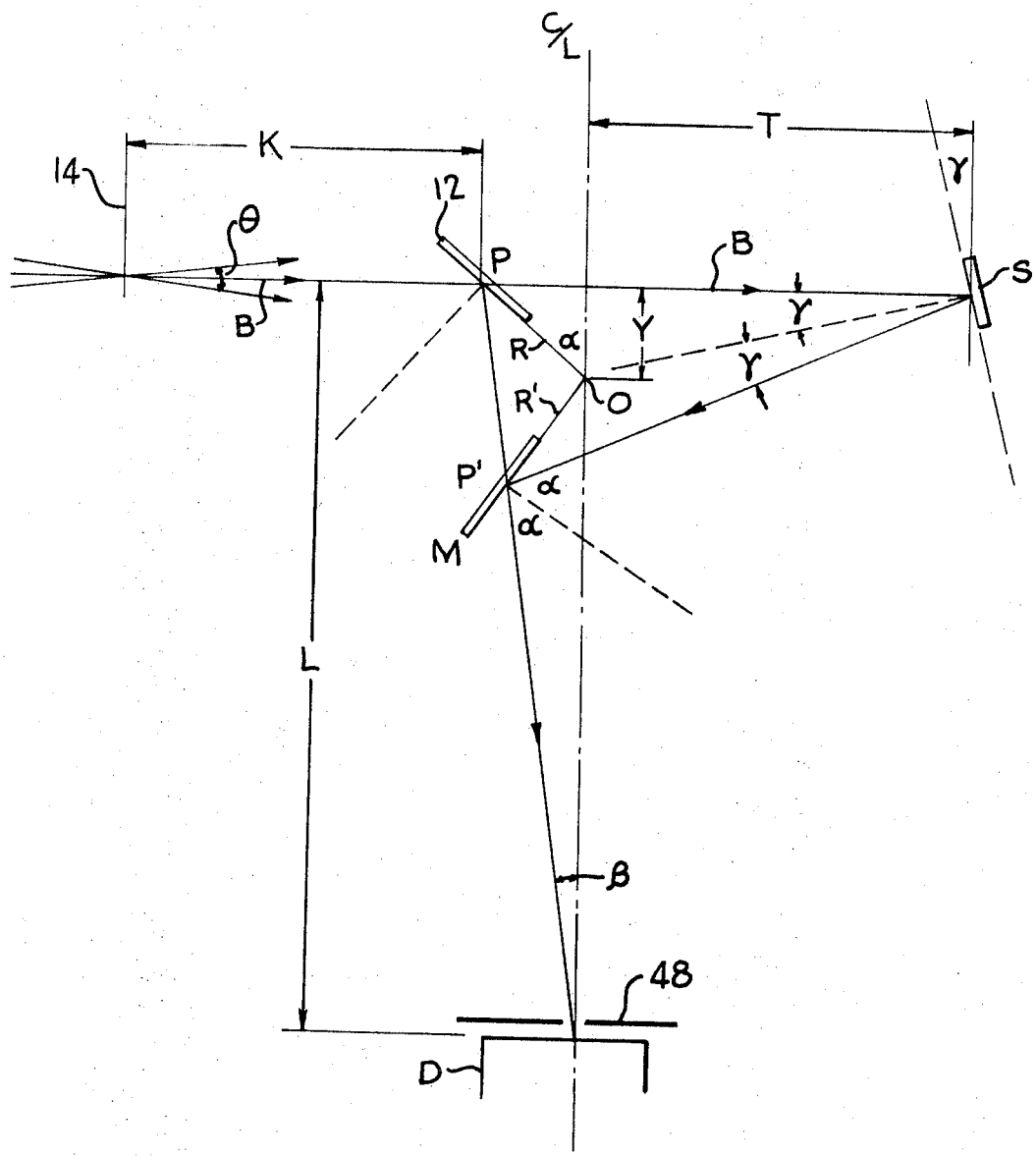
FIG. 5 illustrates diagrammatically the operation of our reflectometer.

FIG. 5 diagrammatically illustrates the operation of our inventive device. Mirror 12, which may be aluminized and coated with magnesium fluoride as is well known, is pivotably mounted on rod 40 (illustrated as axis O) of the mirror holder assembly such that points P and P' may readily be located, as aforedescribed. The reflecting surface of the mirror, whether in the P or P' position, is on a line R or R', which intercepts axis O. Further, axis O lies along centerline C/L which is normal to and intercepts face of detector D and is positioned a distance $Y$ from the direct path of incident beam $B$ (with an angle of dispersion $\Theta$ ) emanating from slit 14 of the monochromator. A mask 48 may be disposed immediately before the detector to limit scattering at high energies.

When the mirror is in the OP or reference position, making an angle $\alpha$ with the centerline, incident beam $b$ is reflected and strikes the center of detector D at an incident angle $B$. When mirror is then pivoted to its OP' or reflectance position, incident beam B is first reflected from sample S at an incident angle $\gamma$, and then travels to the mirror and finally to the detector. The letter $T$ represents the distance from the centerline to the sample, the sample being inclined at an angle $\gamma$ from perpendicular.

It is apparent from the above description that the central ray of the beam reflected from the sample strikes the mirror at the same incident angle and the same point as the beam when the mirror is in the reference position. As a result, the reflected central ray retraces the reference beam path along $P'D$ and falls on the detector at the same point and at the same incident angle $B$. For the case of specular reflection and negligible scattering, such a reflectometer will possess the following characteristics:

1. Reflection changes from the mirror in its two operating modes are precluded if the small polarization changes introduced by the sample are not considered.

2. For parallel light, the illuminated area on the detector is the same when the mirror is in either the reference or the reflectance position. If effects due to the path difference in vacuum resulting from the two mirror positions are neglected, the instrument is an absolute reflectometer if the source intensity is stable.

3. For a divergent beam, the illuminated areas of the mirror or detector are not the same for the two mirror positions. However, since the central ray strikes the same points on the mirror and detector for each mirror mode, the spatial variations in mirror reflectivity and detector sensitivity are minimized. Thus, excellent relative measurements are possible for small beam divergence and small path length difference, in our device.

The above conditions on the references and reflectance beams are satisfied since triangles POP' and PSP' are isosceles. Thus $$\gamma = \beta = 2\alpha\pi/2 \qquad (1)$$

The central ray to detector distance, $L$, is fixed by the dimensions of the chamber and detector. The pivot offset distance, $Y$, must be small compared to the centerline to specimen distance, $T$, in order that the normal incidence criteria of the Fresnel equations at the specimen be satisfied. The angle of incidence, $\gamma$, is determined from $L$ and $Y$ and from Equation (1) by $$\frac{Y}{L} = \frac{\tan \gamma}{\tan \alpha} = 1/2[1 - \cot^2(\gamma/2 + \pi/4)] \qquad (2)$$

For the McPherson specimen chamber and a typical end window photomultiplier tube (EMI 95145), $L = 62.8$ mm. For a choice of $Y = 4.76$ mm., then $\gamma = 4.7°$ and $T = 57.9$ mm. These values are a good compromise among mechanical design considerations, normal incidence criteria and the ratio between the reference and reflectance beam areas in the McPherson specimen chamber.

The horizontal divergence of the beam from the vertical exit slit may be reduced by inserting an optical stop in the monochromator before the radiation was incident on the grating. For a beam with a small angle of horizontal divergence and with a negligible angle of vertical divergence, the ratio of the reflectance beam area to the reference beam area on the detector is given by $$\frac{K + L + 2T}{K + L}$$

where $K$ is the distance from the exit slit to the point $P$, $K$ is approximately 160 mm. in the McPherson chamber. A test of the spatial sensitivity of a sodium salicylate film deposited on the window of a typical photomultiplier (EMI 95145) showed variations less than 2 percent. The mask in front of the detector limits scattering at high energies, as aforementioned. Thus, values of the reflectivity measured in this system should be close to the absolute values since the source intensity remains stable during the measurement. The reflectivity at a given wavelength may be determined by taking the ratio of the detector outputs when the mirror is successively in the reflectance and reference positions.

We claim:

1. In a reflectometer having a chamber which is vacuum-sealable to a monochromator, said chamber having a slit at one portion thereof from passing a beam of light having a desired narrow range of wavelengths produced by said monochromator into said chamber, and a photodetector vacuum mounted at another portion of said chamber, the combination therewith of the improvement for providing substantially specular reflectivity determinations at nearly normal incidence from the visible to vacuum ultraviolet spectral region comprising a totally reflecting mirror mounted on a baseplate within said chamber for rotation about a pivot point to a first location and a second location, said pivot point falling on an imaginary line extended from a reflecting surface of said mirror when said mirror is in either said first location or said second location, a sample mounted within said chamber for controllably receiving said light beam emanating from said monochromator, said light beam being reflected by said reflecting surface of said mirror directly onto a certain point on said detector when said mirror is is in said first location, and indirectly onto said same certain point of said detector when said light beam is reflected from said sample and onto said reflecting surface of said mirror when said mirror is in said second location, said beam reflected from the sample striking the mirror at an incident angle and at a same point as a beam striking said mirror when said mirror is in said said first location whereby all reflected beams strike the detector at substantially the same point and incident angle, and wherein said pivot point is located out of said beam of light traversing between said monochromator and said sample.

2. The device as described in claim 1, wherein said mirror is mounted on a mirror holder assembly, said mirror holder assembly comprising:
   a rotatable knob having a shaft extending through a central opening in said baseplate, said mirror being affixed to an upper portion of said shaft;
   a threaded flange disposed within said baseplate central opening and about said shaft;
   a hollow cap threaded to said flange below said baseplate and around said shaft; and
   means compressible around said shaft and between said cap and said flange for maintaining said mirror holder assembly in vacuum sealed relation with said chamber.

3. The device of claim 2 wherein a pointer rotates with said rotatable knob.

4. The device of claim 3 wherein said mirror first location is determined by said pointer contacting one external stop at an under portion of said baseplate when said knob is rotated in one direction and wherein said mirror second location is determined by said pointer contacting another external stop at another under portion of said baseplate when said knob is rotated in another direction.